Patented Apr. 1, 1941

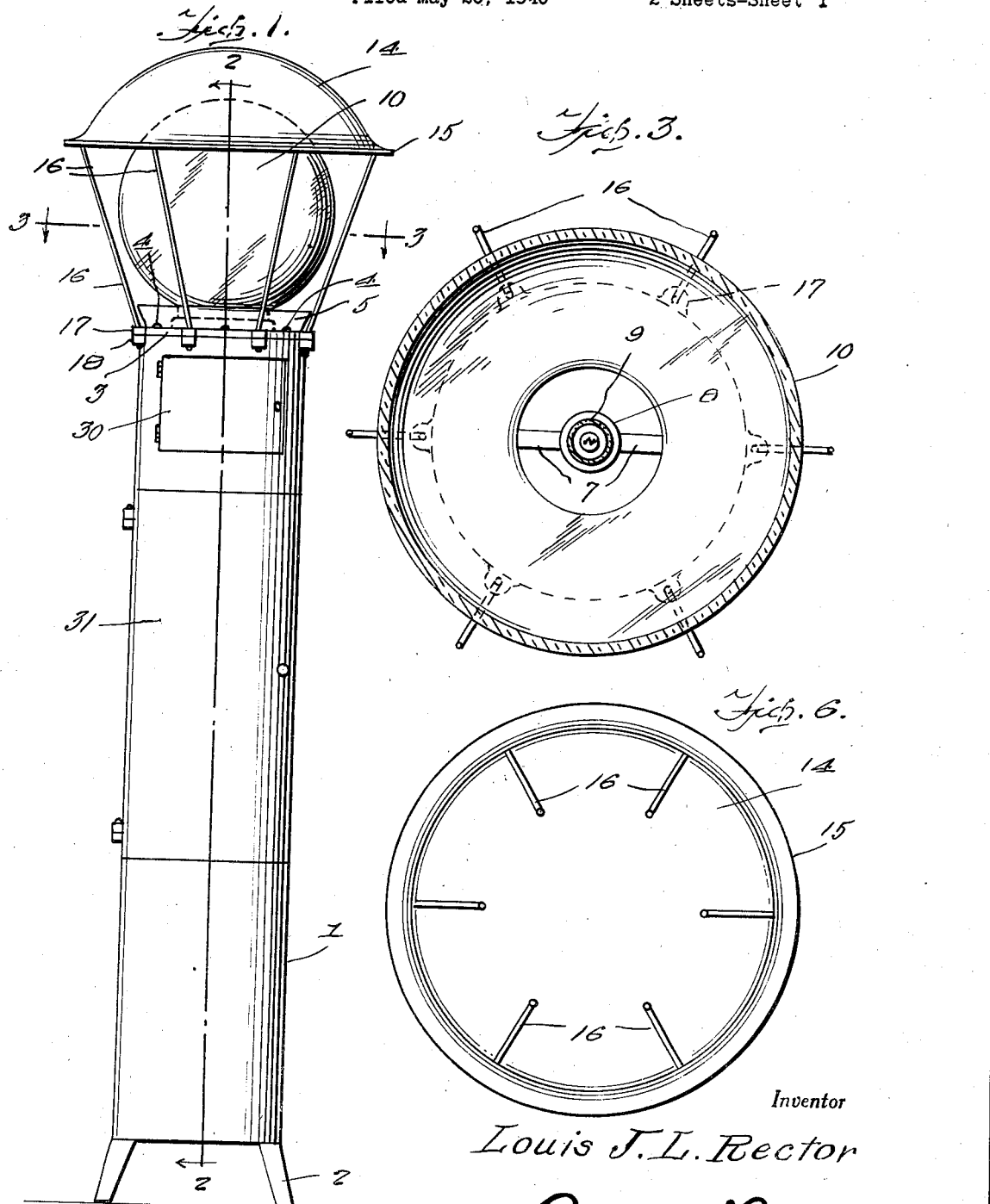

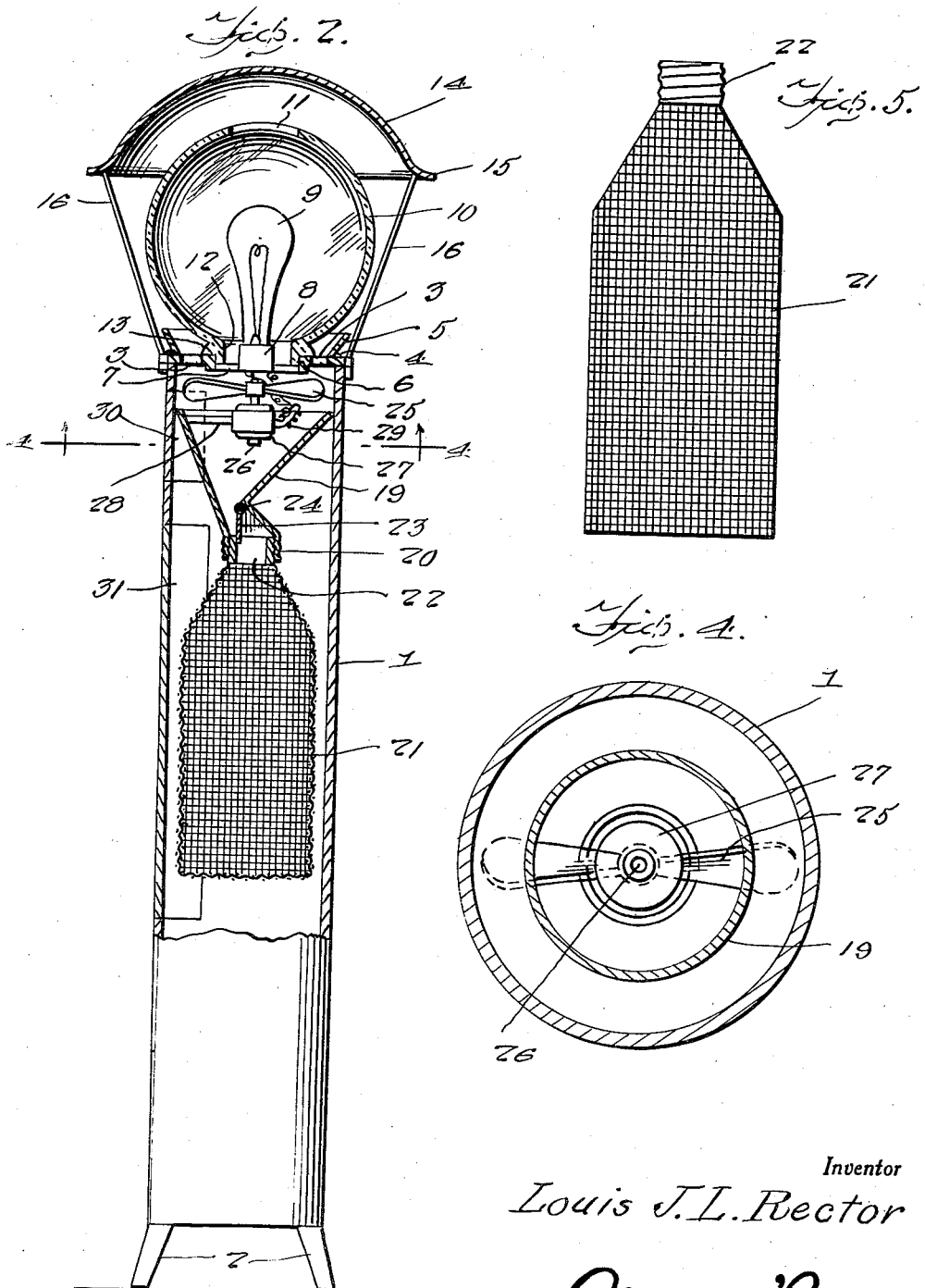

2,236,698

UNITED STATES PATENT OFFICE 2,236,698

COMBINED INSECT TRAP AND TRAFFIC LIGHT

Louis J. L. Rector, Vienna, Va.

Application May 25, 1940, Serial No. 337,264

6 Claims. (Cl. 43—139)

My invention relates primarily to traps for catching insects at night and is designed as an improvement over the trap disclosed in my U. S. Letters Patent No. 1,807,550, dated May 26, 1931.

The principal object of my present invention is to provide a portable insect trap which may be utilized also as a traffic, or signal, light in any location where such a light is desired, is of simplified construction, adapted for ready access to all parts for replacement or repair and comparatively inexpensive to manufacture.

To the accomplishment of the above, and subordinate objects presently appearing, a preferred embodiment of my invention has been illustrated in the accompanying drawings, set forth in detail in the succeeding description and defined in the claims appended hereto.

In said drawings:

Figure 1 is view in side elevation of the preferred embodiment of my invention,

Figure 2 is a view in vertical section taken on the line 2—2 of Figure 1 looking in the direction indicated by the arrows, Figure 3 is a view in transverse section taken on the line 3—3 of Figure 1 looking downwardly and drawn to an enlarged scale, Figure 4 is a similar view taken on the line 4—4 of Figure 2, looking in a direction indicated by the arrows, Figure 5 is a view in side elevation of the sack drawn to an enlarged scale, and Figure 6 is a view of the shield inverted and drawn to an enlarged scale.

Referring to the drawings by numerals, in the illustrated embodiment thereof my invention comprises, as its basic element, a column 1 of any suitable metal, and preferably cylindrical, having open upper and lower ends and short legs 2 suitably secured to the lower end thereof.

A spider 3 is detachably secured, as by bolts 4, to the upper end of the column 1, said spider having a circular, upwardly flaring outer edge flange 5, an axial central aperture 6 therein, and crossbars, as at 7, traversing said opening and supporting in the center of the opening an upstanding electric light socket 8 for an electric light bulb 9 threaded into the socket in the usual manner.

A globe 10, preferably of glass, is removably mounted on the spider 3, said globe having an opening 11 in the top thereof and a bottom neck 12 fitting in the opening 6 and centering the globe on the spider 3, the neck 12 being undercut to provide an external flange 13 around the same seating on the spider 3 around the edge of the opening 6.

Surmounting the globe 10 and spaced a suitable distance above the same is a circular, dome-shaped shield and reflector 14 of suitable light, thin metal, preferably highly polished on the under side thereof, and of a diameter to extend beyond the globe 10 for a short distance. Preferably the shield 14 has a flaring edge 15 to provide for easy access of insects into the space between the globe and shield. The shield 14 is supported by equidistantly spaced upright rods 16 having upper ends suitably secured, as by welding, not shown, to the rim 15 of the shield and lower ends removably inserted in lugs 17, 18, provided on the outer edge of the spider 3 and the upper edge of the column 1, said lugs mating in superposed pairs.

Fitted in the upper end of the column 1 and suitably secured thereto with its upper edge spaced a short distance below said end is a short funnel-like chute 19 terminating at the lower end thereof in an internally threaded socket 20.

Suspended in the column 1 from the socket 20 is a cage-like sack 21 of any suitable reticulative material, such as wire screening, having an externally threaded neck 22 turned into the socket 20 whereby said sack may be detached from the socket by unscrewing at will. The neck 22 is of the requisite size and construction to receive thereon a closure cap, not shown, of the usual large-size Mason jar type, so that when the sack 21 is detached it may be closed by such a cap.

A flap 23 is hinged in the chute 19, as at 24, to depend therefrom into the neck 22 of the sack 21 and to normally obstruct escape of insects from the sack 21 upwardly into the chute, the arrangement of the flap 23 being such that it will be swung into unobstructing position under the action of air pressure directed downwardly into the chute 19 and thereby permit insects to pass downwardly through the chute 19 into said sack.

A suction fan 25 is provided in the upper end of the column 1 between the spider 3 and the chute 19, said fan being fixed on the armature shaft 26 of a small motor 27 supported in the top of the chute 19 with its shaft 26 vertically disposed and by means of a bracket arm 28 extending from one side of said chute.

The electric light bulb 9 and the motor 27 may be wired in any suitable manner to a source of electrical energy, not shown, the wiring extending into the column 1 preferably by way of a single cable represented at 29.

An upper door 30 is provided in the side of the column 1 for access to the motor 27 to oil and service the same, and a lower door 31 for access to the interior of the column 1 to detach and replace the sack 21.

Referring to the use and operation of the described trap, the device is positioned at any street intersection, or other location, where a signal light is required, the light 9 turned on and the motor 27 energized to start the suction fan 25. The light attracts the insects into close proximity to the globe 10. The suction created by the fan 25 draws the insects into the top of the column 1, on the one hand, downwardly through spider 3, and on the other hand into the top of the globe 10 and downwardly through the globe by way of the neck 12. The down draft created by the fan 25 swings the flap 23 into unobstructing position relative to the neck 22 of sack 21 and blows the insects through said chute 19 into said sack. At any desired time the sack 21 may be removed through the door 31 by unscrewing the neck 22 from the socket 20, covered, in the manner already described, for transportation to a research bureau, or the like, and replaced by another sack 21. Obviously, prior to removing sack 21 the motor 27 is stopped. As soon as said motor stops the flap 23 swings under the influence of gravity to obstruct escape of insects from the sack 21 back through the chute 19. By lifting the rods 16 out of the lugs 17, 18, said rods and the shield 14 may be removed for access to the globe 10 to clean the same. By lifting the globe 10 off the seat on the spider 3, the light bulb 9 may be uncovered for replacement when desired.

The foregoing will, it is believed, suffice to impart a clear understanding of my invention without further explanation.

Manifestly the invention, as described, is susceptible of modification without departing from the inventive concept and right is herein reserved to such modifications as fall within the scope of the subjoined claims.

What I claim is:

1. In a device of the class described, a tubular column adapted to be stood in upended position with the upper end thereof open, an electric light mounted in the upper end of the column in spaced relation to the edge of said open end and to attract insects to said end, a globe-like shade mounted on said upper end over said bulb, said globe being open at its top and bottom to permit the passage of insects therethrough into said end, the bottom of the globe being smaller than said end to provide an annular space between the same and the upper edge of the column for the entrance of insects therethrough into said column, and a suction producing device in said column for drawing insects into the column through said globe and space.

2. In a device of the class described, a tubular column adapted to be stood in upended position with the upper end thereof open, an electric light mounted in the upper end of the column in spaced relation to the edge of said open end and to attract insects to said end, a globe-like shade mounted on said upper end over said bulb, said globe being open at its top and bottom to permit the passage of insects therethrough into said end, the bottom of the globe being smaller than said end to provide an annular space between the same and the upper edge of the column for the entrance of insects therethrough into said column, and a suction producing device in said column for drawing insects into the column through said globe and space, said device producing a down draft in the column, and a trap device in said column adapted to receive insects blown thereinto by said device.

3. In a device of the class described, a tubular column adapted to be stood in upended position with the upper end thereof open, an electric light mounted in the upper end of the column in spaced relation to the edge of said open end and to attract insects to said end, a globe-like shade mounted on said upper end over said bulb, said globe being open at its top and bottom to permit the passage of insects therethrough into said end, the bottom of the globe being smaller than said end to provide an annular space between the same and the upper edge of the column for the entrance of insects therethrough into said column, and a suction producing device in said column for drawing insects into the column through said globe and space, said device producing a down draft in the column, and a trap device in said column adapted to receive insects blown thereinto by said device, said trap device being normally closed and opened by said down draft.

4. In a device of the class described, a tubular column adapted to be stood in upended position with the upper end thereof open, an electric light mounted in the upper end of the column in spaced relation to the edge of said open end and to attract insects to said end, a globe-like shade mounted on said upper end over said bulb, said globe being open at its top and bottom to permit the passage of insects therethrough into said end, the bottom of the globe being smaller than said end to provide an annular space between the same and the upper edge of the column for the entrance of insects therethrough into said column, and a suction producing device in said column for drawing insects into the column through said globe and space, said device producing a down draft in the column, and a trap device in said column adapted to receive insects blown thereinto by said down draft, said trap device being normally closed and opened by said down draft, and including an insect containing sack removably mounted in said column.

5. In a device of the class described, a tubular column adapted to be stood in upended position with the upper end thereof open, an electric light mounted in the upper end of the column in spaced relation to the edge of said open end and to attract insects to said end, a globe-like shade mounted on said upper end over said bulb, said globe being open at its top and bottom to permit the passage of insects therethrough into said end, the bottom of the globe being smaller than said end to provide an annular space between the same and the upper edge of the column for the entrance of insects therethrough into said column, a suction producing device in said column for drawing insects into the column through said globe and space, and a shield detachably mounted on the upper end of said column and surmounting said globe in spaced relation thereto to provide for entrance of insects between the same and said globe into the top of the latter.

6. In a device of the class described, a tubular column adapted to be stood in upended position with the upper end thereof open, an electric light mounted in the upper end of the column in spaced relation to the edge of said open end and to attract insects to said end, a globe-like shade mounted on said upper end over said bulb, said globe being open at its top and bottom to permit the passage of insects therethrough into said end, the bottom of the globe being smaller than said end to provide an annular space between the same and the upper edge of the column for the entrance of insects therethrough into said column, a suction producing device in said column for drawing insects into the column through said globe and space, a shield detachably mounted on the upper end of said column and surmounting said globe in spaced relation thereto to provide for entrance of insects between the same and said globe into the top of the latter, and an annular outwardly flaring collar surrounding the upper end of said column and forming an upstanding rim around the edge of the same to facilitate drawing of insects into said space under operation of said suction producing means.

LOUIS J. L. RECTOR.